United States Patent [19]

Sanford

[11] 4,112,578
[45] Sep. 12, 1978

[54] APPARATUS FOR DISASSEMBLING PALLETS

[75] Inventor: Dale J. Sanford, Anthony, Kans.

[73] Assignee: Curfman, Brainerd, Harris, Bell, Weigans and Depew, Wichita, Kans.

[21] Appl. No.: 813,896

[22] Filed: Jul. 8, 1977

[51] Int. Cl.² ............................................. B23P 19/00
[52] U.S. Cl. .......................................... 29/700; 29/252; 29/427; 29/824
[58] Field of Search .................. 29/427, 824, 791, 799, 29/252, 700, 426, 244, 256, 258; 100/226, 227

[56] References Cited

U.S. PATENT DOCUMENTS

| 3,740,815 | 6/1973 | Campbell et al. | 29/427 X |
| 3,846,890 | 11/1974 | Bielkiewicz | 29/252 X |
| 3,899,816 | 8/1975 | Jennings | 29/252 X |
| 3,916,498 | 11/1975 | Lopez | 29/252 X |
| 3,991,459 | 11/1976 | Rapp | 29/252 |
| 4,051,588 | 10/1977 | Conkel | 29/252 |

*Primary Examiner*—Victor A. DiPalma
*Attorney, Agent, or Firm*—John H. Widdowson; Edwin H. Crabtree

[57] ABSTRACT

An apparatus for disassembling a standard wooden pallet having parallel top and bottom boards nailed to lateral stringers therebetween. The apparatus first removing the top boards from the lateral stringers and then removing the stringers from the bottom boards thereby completely disassembling the pallet.

8 Claims, 5 Drawing Figures

APPARATUS FOR DISASSEMBLING PALLETS

BACKGROUND OF THE INVENTION

This invention relates generally to an apparatus for disassembling wooden structures nailed together and more particularly, but not by way of limitation, to an apparatus for disassembling wooden pallets.

Heretofore, there have been various types of apparatuses for disassembling pallets, wooden crates and various types of wooden structures. Also, there has been complex hydraulic equipment used for individually disassembling pallet boards and stringers.

None of the prior art disassembling machines provide the novel structure and the advantages of the subject invention.

SUMMARY OF THE INVENTION

The subject invention solves the problem of quickly and economically disassembling a wooden pallet. The apparatus eliminates disassembling wooden pallets by hand thereby greatly reducing labor cost.

The invention is easy to operate and quickly disassembles the top boards from the pallet and then the stringers from the bottom boards without breaking or damaging the wooden boards during the disassembling.

The apparatus may be mounted on a conventional flat bed truck, flat bed trailer, or the like, for providing mobility in the operation of disassembling pallets at various locations.

The apparatus may also be used for disassembling a damaged pallet so that new top boards, bottom boards, or stringers may be replaced when the pallet is reassembled.

The apparatus for disassembling wooden pallets includes a vertical side frame mounted on the side of a flat bed with the ends of a side crossbar slidably mounted on the side frame. The crossbar is raised and lowered by a side frame cylinder. The crossbar includes a plurality of "C" shaped members mounted along its length for engaging the top boards of the pallet and lifting the top boards upwardly away from the stringers when the side frame cylinder is raised. Mounted at the rear of the flat bed is a vertical rear frame having a rear crossbar slidably mounted on the frame. A hydraulic hold down cylinder is slidably mounted on the rear crossbar and when activated is lowered downwardly against the top of the bottom boards to hold the bottom boards in place. A plurality of clamp hydraulic cylinders are attached to a support frame which in turn is attached to the rear crossbar. The clamp cylinders are pivotally attached to clamp arms having clamp plates attached thereto. The clamp plates engage the sides of the lateral stringer compressing the stringer against the side of the rear crossbar. A hydraulic lift cylinder is attached to the rear frame and the rear crossbar for raising the crossbar thereby lifting the stringer upwardly and disengaging the stringer from the bottom boards.

The advantages and objects will become evident from the following detailed description when read in conjunction with the accompanying drawings which illustrate the preferred embodiments of the invention.

DETAILED DESCRIPTION OF THE DRAWINGS

Figure 1:
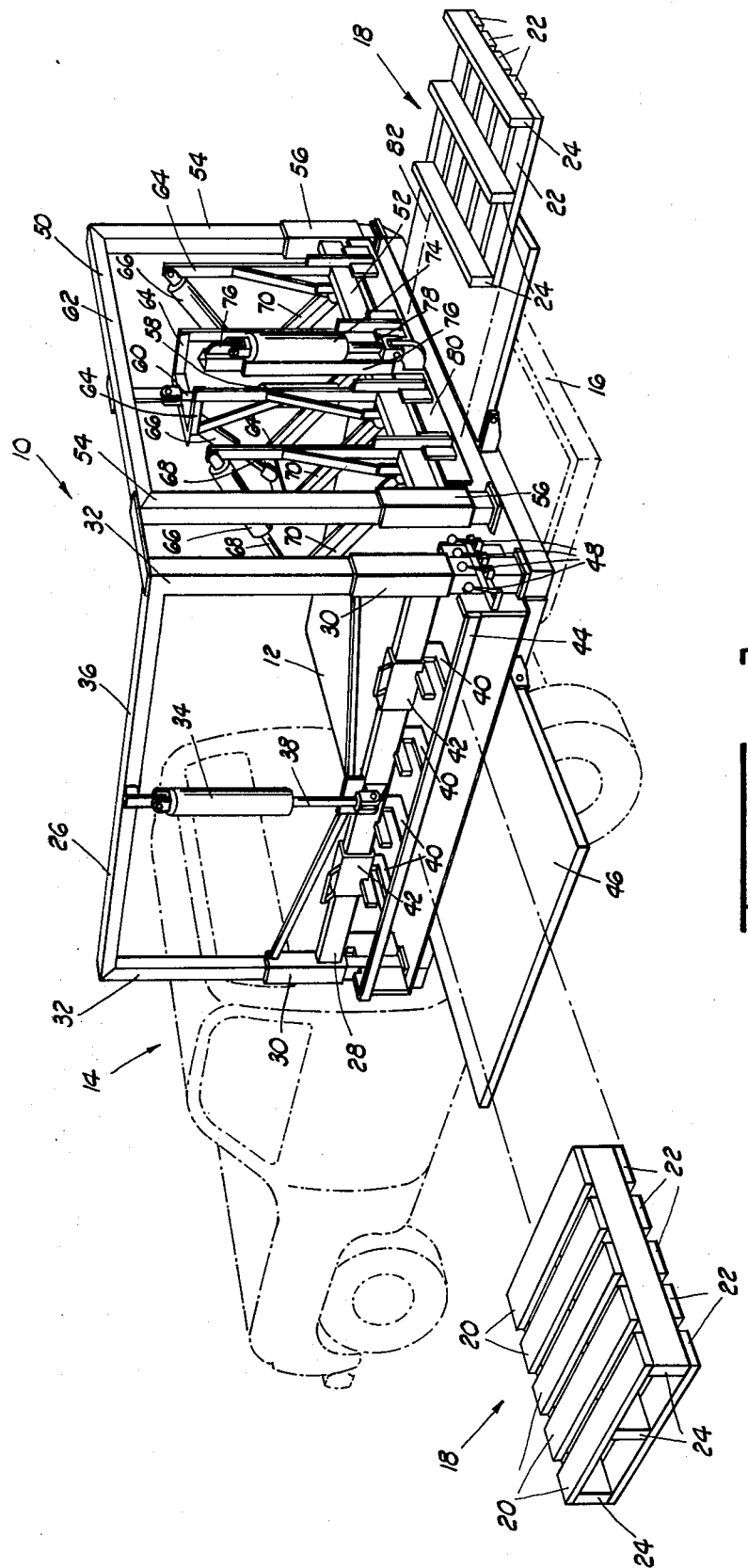
In FIG. 1, a perspective view of the apparatus for disassembling pallets is illustrated mounted on the rear of a flat bed truck.

In FIG. 1, the apparatus for disassembling pallets is designated by general reference numeral 10. The apparatus 10 is mounted on the side and rear of a flat bed 12 at the rear of a truck 14. The flat bed 12 is mounted on top of the rear of a truck frame 16. While the flat bed 12 of the truck 14 is shown, the apparatus 10 can also be mounted on a trailer or on a stationary structure.

The apparatus is used for disassembling a wooden pallet 18. The pallet 18 is a standard type of pallet used with fork lifts and includes parallel top boards 20 and parallel bottom boards 22 which are nailed to lateral stringers 24 which are disposed between the boards 20 and 22.

The apparatus 10 includes a vertical side frame 26 with a side crossbar 28 horizontally disposed and slidably attached to the side frame 26 by tubular connectors 30 which are raised and lowered on vertical bracing 32 of the frame 26.

A side frame hydraulic cylinder 34 is mounted at one end to a horizontal bracing 36 of the frame 26. A hydraulic ram 38 of the cylinder 34 is attached to the center of the side crossbar 28. Disposed at the bottom of the crossbar 28 are a plurality of "C" shaped members 40 which are used for engaging the top board 20. Two of the "C" shaped members 40 are attached to angular sleeves 42 which are adjustable at both ends of the side crossbar 28 so that the "C" shaped members 40 may be adjusted for various widths of pallets 18. Disposed adjacent the crossbar 28 and attached at the ends to the frame 26 is a horizontal hold down bar 44. The hold down bar 44 is positioned above a side platform 46 which is used for receiving the pallet 18. The distance between the top of the platform 46 and the bottom of the hold down bar 44 is sufficient to receive the pallet 18 therebetween.

In operation, the top boards 20 of the pallet 18 are removed by placing the pallet 18 on the side platform 46 with the top boards 20 parallel to the crossbar 28. The pallet 18 is moved under the hold down bar 44 with the end top board 20 slidably received in the "C" shaped members 40. The "C" shaped members 40 are adjusted so that they do not conatct the ends of the lateral stringers 24 by either moving the "C" shaped members 40 on the adjustable sleeves 42 or moving the pallet 18 laterally on the platform 46.

When the "C" shaped members 40 are engaged with the top board 20 the side frame cylinder 34 is activated by moving one of the handles 48 shown mounted on the side frame 26 which are connected to the hydraulic system. The hydraulic hose connections and hydraulic pump are not shown in the drawings and it should be appreciated that any standard type of hydraulic system may be used with the apparatus 10.

When the cylinder 34 is activated and ram 38 is raised, the crossbar 28 in turn is raised on the frame 26 thereby lifting the "C" shaped members 40 upwardly raising the top board 20 and disengaging the board 20 from the stringers 24. As the board 20 is raised, the pallet 18 is held in place by the hold down bar 44 which prevents the pallet 18 from being raised when the top board 20 is removed. When the top board 20 is removed, the "C" shaped members 40 and the crossbar 28 are again lowered and the next top board 20 is moved forward into the "C" shaped members 40 and the operation is repeated until all of the top boards 20 are removed from the stringers 24. As the top boards 20 are removed, the remaining pallet 18 is moved forward from the platform 46 on to the flat bed 12.

The apparatus 10 further includes a vertical rear frame 50 mounted at the rear of the flat bed 12 and having a horizontal rear crossbar 52 slidably mounted on vertical bracing 54 of the frame 50 by tubular connectors 56 mounted at the ends of the crossbar 52.

Figure 5:
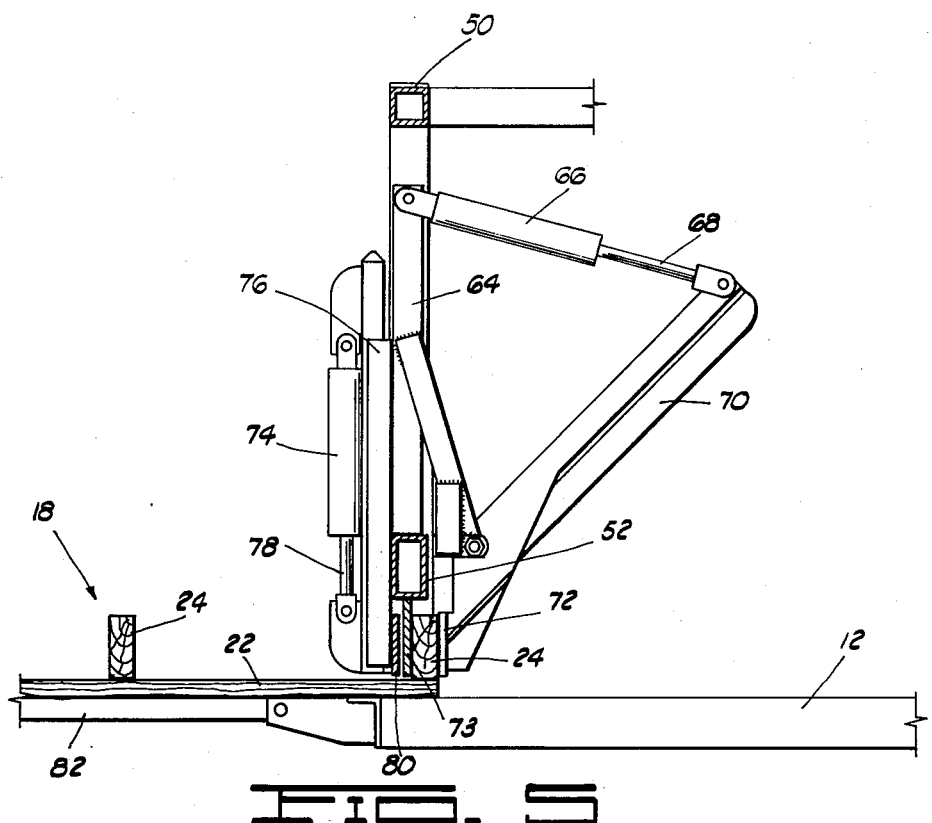
FIG. 5 is a side view of the vertical rear frame.

The crossbar 52 is raised and lowered on the frame 52 by a rear lift hydraulic cylinder 58 which is attached at one end to the crossbar 52 with a hydraulic ram 60 attached to a horizontal bracing 62 of the frame 50. The lift cylinder 60 is partially hidden behind a support frame 64 which is used for pivotally attaching a plurality of clamp hydraulic cylinders 66. Hydraulic rams 68 of the clamp cylinders 66 are pivotally attached to clamp arms 70 which in turn are attached to clamp plates 72 which are shown in FIG. 5. The clamp plates 72 are used for clamping the stringers 24 of the pallet 18 against the side of a bearing plate 73 which is attached to the bottom of the rear crossbar 52. A side view of the plate 73 is seen in FIG. 5.

A hold down cylinder 74 is slidably mounted in a slide 76 which is attached to the rear crossbar 52. Attached to a ram 78 of the hold down cylinder 74 is a horizontal rear hold down bar 80 which is used for holding the pallet 18 in place when the stringers 24 are removed from the bottom boards 22.

Pivotally attached to the rear of the flat bed 12 is a rear platform 82 which is used for receiving the pallet 18 thereon after the top boards 20 have been removed therefrom.

After the top boards 20 have been removed from the pallet 18, the remaining lateral stringers 24 and bottom boards 22 are placed on the rear platform 82 with the stringers 24 parallel to the rear crossbar 52. The hold down cylinder 74 is activated using one of the handles 48 and the rear hold down bar 80 is raised. The rear crossbar 52 is raised so that the end lateral stringer 24 can be disposed adjacent the clamp plates 72. The rear crossbar 52 is then lowered and the clamp plates 72 compress the lateral stringer 24 against the side of the bearing plate 73 by activating the clamp cylinders 66. The hold down cylinder 74 is then activated by moving one of the handles 48 and lowering the hydraulic ram 78 thereby urging the rear hold down bar 80 against the top of the bottom boards 22. The bottom boards 20 are now held in place while the hydraulic lift cylinder 58 is activated thereby raising the bearing plate 73 and clamp plates 72 which are holding the lateral stringer 24 therebetween. The stringer 24 is raised upwardly thereby disengaging the stringer 24 from the bottom boards 22. The stringer 24 is then removed by activating the clamp cylinders 66 thereby releasing the stringer 24.

The remaining pallet 18 is then moved forward on the rear platform 82 and flat bed 12 and the next lateral stringer 24 is again engaged between the clamp plates 72 and the side of the bearing plate 73. The operation is repeated until all of the lateral stringers 24 are removed from the bottom boards 22. At this time, the pallet 18 has been completely disassembled without damaging or breaking the top boards 20, bottom boards 22, and the lateral stringers 24.

Figure 2:
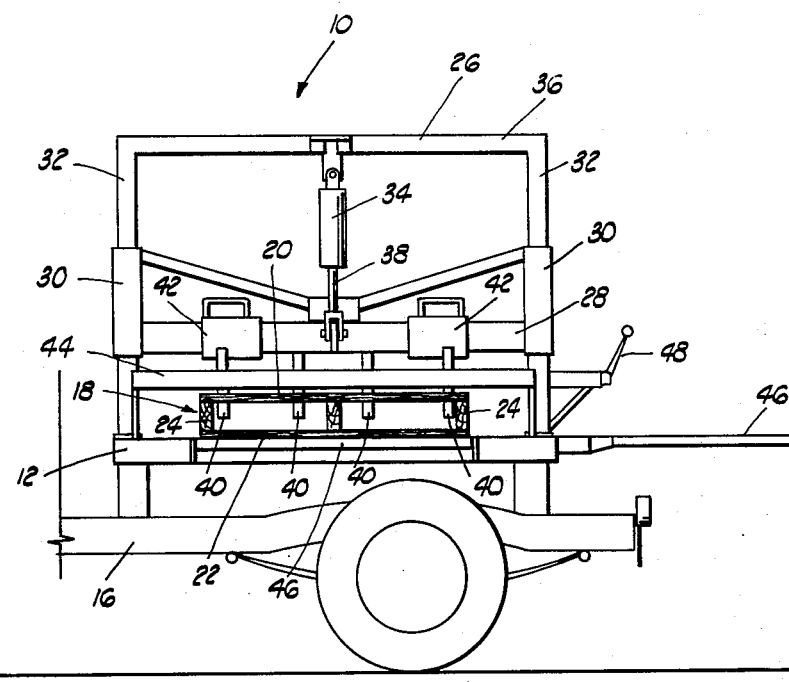
FIG. 2 illustrates a front view of the vertical side frame side crossbar.

In FIG. 2, a front view of the vertical side frame 26 is illustrated. In this figure, the crossbar 28 can be seen in a lowered position for receiving the pallet 18 which is placed on top of the platform 46. The top board 20 of the pallet 18 can be seen received in the "C" shaped members 40. The two stationary "C" shaped members mounted in the center of the side crossbar 28 are disposed on either side of the center stringer 24. The adjustable "C" shaped members 40 which are slidably mounted on the ends of the crossbar 28 are adjusted and are positioned adjacent the lateral stringers mounted on the outside of the pallet 18. In this view, the hold down bar 44 can be seen disposed directly above the top boards 20 for engaging the pallet 18 when the top board 20 is raised on the "C" shaped members.

Figure 3:
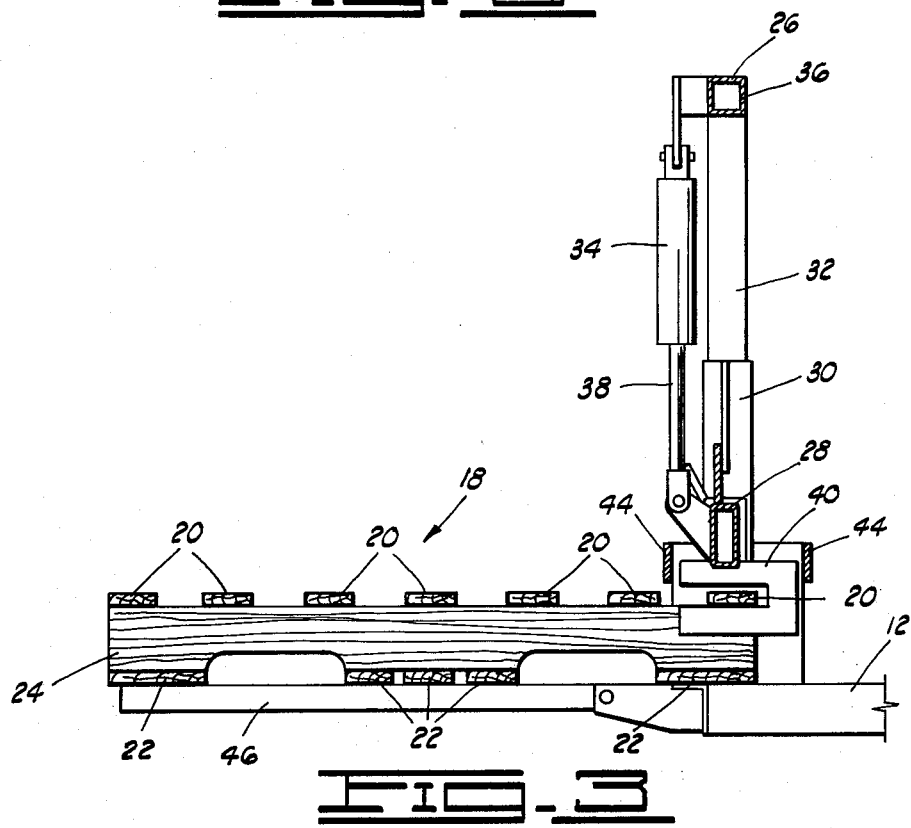
FIG. 3 is a side view of the vertical side frame.

In FIG. 3, a side view of the vertical side frame 26 is illustrated. In this view, a cross section of the horizontal bracing 36, hold down bar 44, and side crossbar 28 can be seen.

One of the "C" shaped members 40 can be seen disposed around the end top board 20 of the pallet 18. It should be noted in this view the hold down bar 44 is shown with an additional bar mounted on the opposite side of the frame 26 so that as the pallet 18 is moved forward, the hold down bar 44 will engage the pallet 18 on both sides of the top board 20 as the top board 20 is disengaged from the lateral stringers 24.

Figure 4:
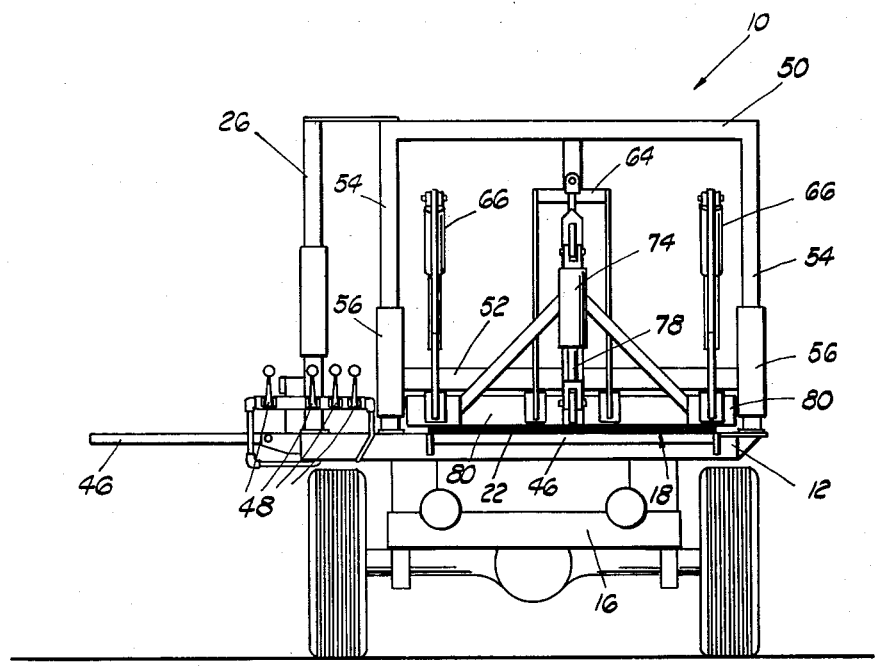
FIG. 4 is a front view of the vertical rear frame.

In FIG. 4, a front view of the vertical rear frame 50 is illustrated. In this view, the pallet 18 is shown with the top boards 20 removed and a lateral stringer 24 engaged between clamp plates 72 and bearing plate 73 with hold down bar 80 in a lowered position for holding the bottom boards 22 in place.

In FIG. 5, the bearing plate 73 and clamp plates 72 can be seen more clearly engaging the sides of the lateral stringer 24. Prior to receiving the pallet 18, the hold down cylinder 74 is raised along with rear lift hydraulic cylinder 58. The lateral stringer 24 is moved forward on top of rear platform 82 until it contacts the sides of the clamp plate 72. The rear lift cylinder 58 is then lowered thereby lowering the rear crossbar 52 and bearing plate 73 downward adjacent the side of the lateral stringer 24. The clamp cylinders 66 are then activated and rams 68 move outwardly thereby rotating clamp arms 70 downwardly pivoting the clamp plates 72 against the sides of the lateral stringer 24 and compressing it against the side of the bearing plate 73. The hold down cylinder 74 is then activated lowering the hold down bar 80 which engages the top of the bottom boards 22 holding them against the top of the flat bed 12. The rear lift hydraulic cylinder 58 which is shown in FIG. 1 is then activated which lifts the rear crossbar 52 with bearing plate 73 and support frame 64 with clamp cylinders 66 attached thereto upwardly thereby lifting the lateral stringer 24 and disengaging it from the bottom boards 22. When the lateral stringer 24 is disengaged, the clamp cylinders 66 are again activated with the clamp plates 72 releasing the disengaged stringer 24 from the side of the bearing plate 73. At this time, the remainder of the pallet 18 is again moved forward and the remaining stringers 24 are disengaged from the bottom boards 22 until the pallet 18 is completely disassembled.

Changes may be made in the construction and arrangement of the parts or elements of the embodiment as disclosed herein without departing from the spirit or scope of the invention as defined in the following claims.

I claim:

1. An apparatus for disassembling pallets, the apparatus mounted on the rear of a flat bed truck, a flat bed trailer, or the like, the pallet being a standard wooden pallet used with a fork lift and having parallel top boards and bottom boards nailed to lateral stringers therebetween, the apparatus comprising:

a vertical side frame mounted on the side of the flat bed;

means for removing the top boards of the pallet, said means for removing slidably mounted on said side frame, said means for removing receiving the top boards therein and raising the top boards upwardly thereby disengaging the top boards from the stringers;

a vertical rear frame mounted on the rear of the flat bed and disposed adjacent one end of said side frame; and means for removing the lateral stringers of the pallet, said means for removing the lateral stringers clamping the stringers therebetween and raising the stringers upwardly thereby disengaging the stringers from the bottom boards of the pallet.

2. The apparatus as described in claim 1, wherein means for removing the top boards of the pallet includes:

a horizontal side crossbar, the ends of the crossbar slidably mounted on said side frame;

a side frame hydraulic cylinder attached at one end to said vertical side frame, the other end attached to said side crossbar for raising and lowering said crossbar on said vertical side frame; and a "C" shaped member disposed below said side crossbar and attached thereto, said "C" shaped member receiving a portion of a top board of the pallet therein, said "C" shaped member engaging and removing the top board from the pallet when said side crossbar is raised by said side frame hydraulic cylinder; and a side hold down bar disposed adjacent to said side crossbar and parallel thereto, the ends of said hold down bar attached to said vertical side frame, said hold down bar engaging the top of the pallet and holding the pallet in place when the top boards are disengaged from the lateral stringers.

3. The apparatus as described in claim 2, further including a foldable side platform pivotally attached to the side of the flat bed and disposed in front of said side frame for receiving the pallet thereon.

4. The apparatus as described in claim 2, further including a plurality of "C" shaped members slidably attached to said crossbar, said "C" shaped members adjustable along the length of said crossbar for receiving pallets of various widths.

5. The apparatus as described in claim 1, wherein said means for removing said lateral stringers includes:

a horizontal rear crossbar, the ends of said rear crossbar slidably mounted on said vertical rear frame;

a hold down hydraulic cylinder slidably mounted on said rear crossbar;

a rear hold down bar attached to said hold down cylinder for engaging the bottom boards of the pallet when said hold down cylinder is lowered;

a clamp hydraulic cylinder attached at one end to a support frame attached to said rear crossbar;

a clamp arm pivotally attached to the other end to said clamp cylinder;

a clamp plate attached to the end of said clamp arm and engaging the side of a lateral stringer when said clamp cylinder is lowered and compressing the lateral stringer between said clamp plate and said rear crossbar; and a hydraulic lift cylinder attached at one end to the top of said vertical rear frame, the other end of said lift cylinder attached to said rear crossbar for raising said crossbar and said clamp plate with the lateral stringer therebetween thereby disengaging the lateral stringer from the bottom boards.

6. The apparatus as described in claim 5, further including a foldable rear platform pivotally attached to the rear of the flat bed and disposed in front of said rear frame for receiving the pallet with the top boards removed thereon.

7. The apparatus as described in claim 5, further including a plurality of clamp hydraulic cylinders attached to the support frame and pivotally attached to clamp arms having clamp plates attached thereto.

8. An apparatus for disassembling pallets, the apparatus mounted on the rear of a flat bed truck, a flat bed trailer, or the like, the pallet being a standard wooden pallet used with a fork lift and having parallel top boards and bottom boards nailed to lateral stringers therebetween, the apparatus comprising:

a vertical side frame mounted on the side of the flat bed;

a horizontal side crossbar, the ends of said crossbar slidably mounted on said side frame;

a side frame hydraulic cylinder attached at one end to said vertical side frame, the other end attached to said side crossbar for raising and lowering said crossbar on said side frame;

a plurality of "C" shaped members disposed below and attached to said side crossbar, said "C" shaped members adjustable along the length of said side crossbar for receiving a portion of a top board of the pallet therein and engaging and removing the top board from the pallet when said side crossbar is raised by said side frame cylinder;

a side hold down bar disposed adjacent said side crossbar and parallel thereto, the ends of said hold down bar attached to said vertical side frame, said hold down bar engaging the top of the pallet and holding the pallet in place when the top boards are disengaged from the lateral stringers;

a vertical rear frame mounted on the rear of the flat bed and disposed adjacent one end of said side frame;

a horizontal rear crossbar, the ends of said rear crossbar slidably mounted on said vertical rear frame;

a hold down hydraulic cylinder slidably mounted on said rear crossbar;

a rear hold down bar attached to said hold down cylinder for engaging the bottom boards of the pallet when said hold down cylinder is lowered;

a plurality of clamp hydraulic cylinders attached at one end to a support frame attached to said rear crossbar;

a plurality of clamp arms pivotally attached at one end to said clamp cylinders;

a plurality of clamp plates attached to the other end of said clamp arms and engaging the side of a lateral stringer when said clamp cylinders are lowered and compressing the lateral stringer between said clamp plates and said rear crossbar; and a lift hydraulic cylinder attached at one end to the top of said vertical rear frame, the other end of said lift cylinder attached to said rear crossbar for raising said crossbar and said clamp plates with the lateral stringer therebetween thereby disengaging the lateral stringer from the bottom boards.

* * * * *